United States Patent [19]

Cymbalisty

[11] 3,935,076

[45] Jan. 27, 1976

[54] TWO STAGE SEPARATION SYSTEM

[75] Inventor: Lubomyr M. O. Cymbalisty, Edmonton, Canada

[73] Assignees: Canada-Cities Service, Ltd.; Atlantic Richfield Canada Ltd.; Gulf Oil Canada Ltd., all of Canada

[22] Filed: Aug. 23, 1974

[21] Appl. No.: 500,092

Related U.S. Application Data

[62] Division of Ser. No. 364,343, May 29, 1973, Pat. No. 3,487,789.

[52] U.S. Cl............................ 196/14.52; 208/11 LE
[51] Int. Cl.².................... B01D 11/00; C10G 1/00
[58] Field of Search........ 208/11, 11 LE; 196/14.52

[56] References Cited
UNITED STATES PATENTS

| | | | |
|---|---|---|---|
| 3,173,763 | 3/1965 | Miller et al. | 196/14.52 |
| 3,271,293 | 9/1966 | Clark | 196/14.52 |
| 3,502,565 | 3/1970 | Baillie | 208/11 LE |
| 3,509,037 | 4/1970 | Tse | 208/11 LE |
| 3,553,098 | 1/1971 | Claridge et al. | 208/11 LE |
| 3,784,464 | 1/1974 | Kaminsky | 208/11 LE |
| 3,891,496 | 6/1975 | Erwin | 159/47 R |

Primary Examiner—Jack Sofer
Attorney, Agent, or Firm—Millen, Raptes & White

[57] ABSTRACT

This invention is an improvement on the hot water process for recovering bitumen from tar sand. The aqueous slurry of tar sand is introduced into a first vessel, termed the sand separation cell, containing a body of hot water. The coarse sand settles out and is discharged as tailings. The top product, comprising bitumen, water and fine sand, is transferred to a second vessel, termed the froth formation cell, containing a second body of hot water. In this latter cell, the bitumen forms froth and is recovered, and the fine solids and some water are recycled to the lower end of the sand separation cell. Because the coarse sand has previously been removed in the sand separation cell, good distribution of the feed across the cross-sectional area of the froth formation cell is achieved. This leads to good recoveries and froth quality. By recycling the fines from the froth formation cell to the vicinity of the tailings outlet of the sand separation cell, the fines can be eliminated from the system without the need for a middlings dragstream, as is required in the prior art.

4 Claims, 2 Drawing Figures

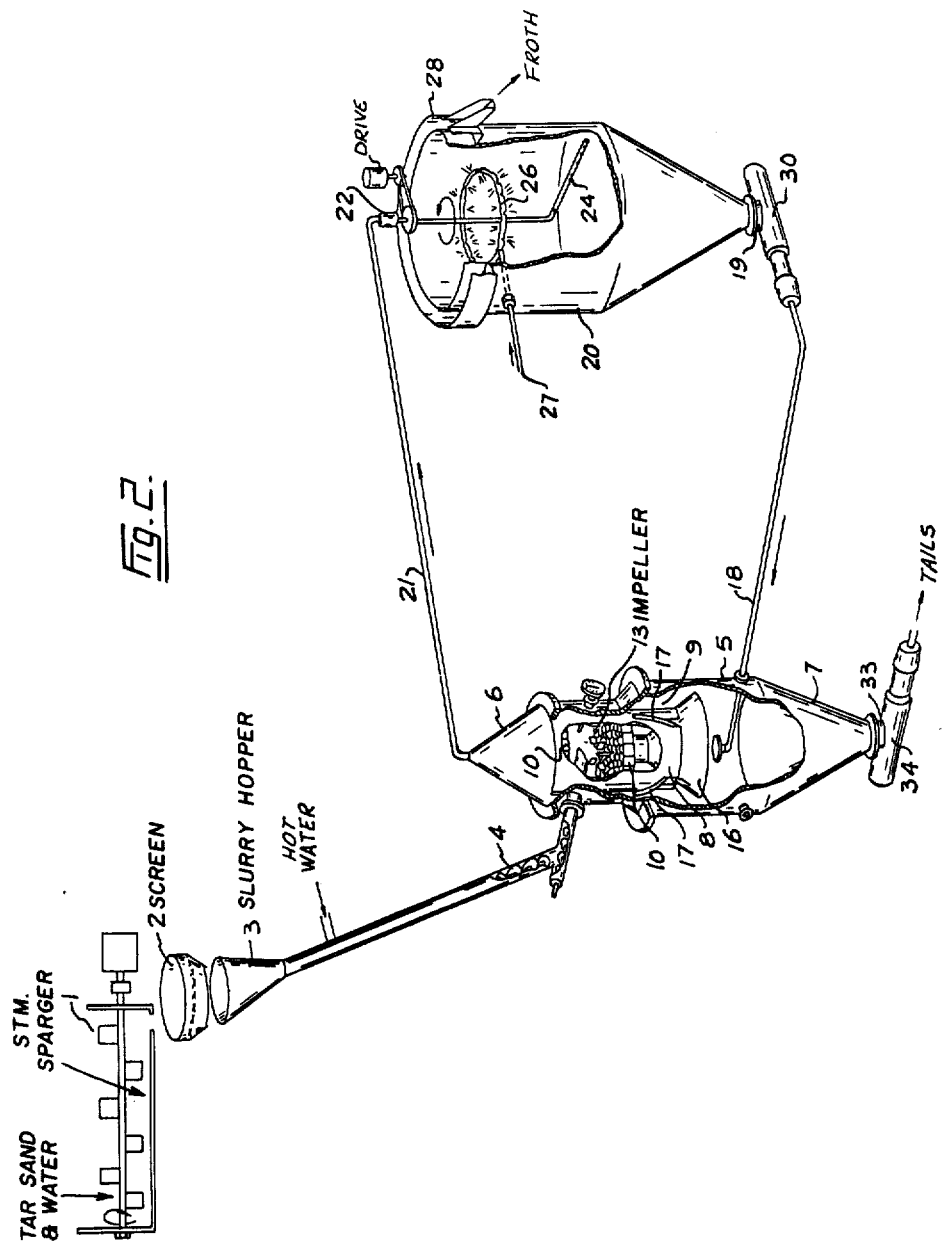

TWO STAGE SEPARATION SYSTEM

This is a division, of application Ser. No. 364,343, filed May 29, 1973, now U.S. Pat. No. 3,487,789.

BACKGROUND OF THE INVENTION

This invention relates to a hot water process for recovering bitumen from tar sand, and to the apparatus for practising the process.

Tar Sand

The invention has been developed using tar sand from the Athabasca deposit at Fort McMurray, Alberta, Canada. While it is described with reference to that feed stock, the invention may find beneficial application to tar sands present in other deposits.

Athabasca tar sand comprises sand grains which are each sheathed in a thin layer of water. Bitumen is trapped in the void space between the water-wet grains. By way of example, the composition of the tar sand might be 10 percent by weight bitumen, 4 percent water, and 86 percent solids.

THE KNOWN HOT-WATER PROCESS

Athabasca tar sands are presently processed using a method commonly referred to as the hot water method. In accordance with this process, tar sand is mixed in a conditioning drum or tumbler with hot water and steam. While in the tumbler, the tar sand disintegrates and at the same time liberated bitumen is aerated. By "disintegrate" is meant that the sand and bitumen particles are dispersed one from another in a preliminary way.

The tumbler product, a porridge-like slurry, is flooded with additional hot water to further disperse the sand and bitumen. This flooding operation is usually carried out at a screen positioned at the outlet from the tumbler. The flooded slurry typically might have a composition of 7 percent bitumen, 43 percent water, and 50 percent solids and a temperature of 160°F.

The flooded slurry is introduced into a separation cell. This cell is a cylindrical settler having a conical bottom and containing a body of hot water. When the slurry mixes with the water, the sand and bitumen particles are further dispersed one from another. The bulk of the sand particles fall to the bottom of the settler; most of the bitumen particles, which have preferentially become attached to bubbles of air, rise to the top surface of the cell contents, where they form a froth. The sand leaves the vessel through a bottom outlet and is discarded as tailings. The froth overflows the vessel wall into a launder and is removed for further treatment.

While the settler-froth formation operation appears simple in theory, in practise it involves many considerations and is not easy to design or operate.

BASIC OBJECTIVES

There are four basic objectives which one seeks to achieve when working with the hot water process. These are: (1) high recovery of bitumen; (2) good quality of froth; (3) low consumption of water in the process; and (4) successful handling of the fines (i.e. —44 micron) present in the feed.

To achieve high recovery, it is self-evident that the bitumen must be made to report in the froth. In practise, some of it ends up in the tailings and is lost. At the present state of the art, recoveries as froth of 87–92 percent of the bitumen in the tar sand feed as considered good.

To achieve good quality froth, one must minimize the amount of solids and water reporting in the froth. A typical prior art froth composition comprises 57 percent bitumen, 8 percent solids, and 35 percent water.

The amount of water used in the process is partly dictated by the amount of fines present in the tar sand feed entering the plant. If the fines become concentrated beyond a critical level in the settler-froth formation cell, the cell will become inoperative. This is because the fines form a dense, floating bed or gel through which the bitumen particles cannot rise to reach the froth-water interface and the settling of sand is hindered. One standard solution for this problem is to supply enough clear water to the cell to make sure that the fines never concentrate beyond the critical level. The water added for this purpose must be hot, so as to maintain the cell temperature at the desired level — usually about 180°F. It is thus seen that the heat input to the process is affected by the amount of water used, and the minimum amount of water permissible is presently dictated by gelling considerations.

Since one will want to keep the heat input as low as possible, it is desirable to minimize the water consumption while still keeping the cell operative.

HIGH RECOVERY OF BITUMEN

As previously stated, the sand tailings stream from the cell takes some bitumen with it; this constitutes a loss and lowers the bitumen recovery.

The bitumen tends to accompany water; if the cell is operated with a lot of water and the solids content of the tailings stream is, for example, 45 percent, then the bitumen losses with the tailings are high. On the other hand, if the cell is operated with a sand tailings stream containing a solids content in the order of 65 - 70 percent, then losses are much lower. Due to the gelling and separation problems, there is usually an excess of water in the cell over that amount which can be handled through the tailings outlet.

The excess water is withdrawn from the middle of the cell as a dragstream. This middlings dragstream contains bitumen and must, therefore, be processed through a flotation cell to recover the contained bitumen in the form of secondary froth. The flotation cell involves aerating the dragstream turbulently; as a result, the secondary froth is contaminated with large amounts of solids and water. This secondary froth is combined with the primary froth from the settler-froth formation cell to produce the feed for the dehydration and upgrading processes which follow.

It has been found that some of the bitumen introduced to the cell is only semi-buoyant. It may not have been well enough aerated or it may have become associated with solids. In either case, this bitumen tends to accumulate just above the sand layer which exists at the base of the cell. It tends to get trapped in the sand and leaves as part of the tailings.

It is therefore one object of this invention to provide a system characterized by high recovery of bitumen. It is another object to provide a system which can operate using a relatively small quantity of water. It is another object to provide a system which does not need a middlings dragstream and secondary recovery circuit.

GELLING

Gelling tends to occur in quiescent zones in the separation cell. For example, one zone in which gelling is likely to occur is located just above the well through which the slurry is introduced into the cell.

It is therefore an object of this invention to provide a system wherein the fines are kept moving to prevent gelling. It is another object to introduce low-solids water additions to the system in certain zones, where gelling is likely, to keep the fines dispersed in those zones.

The prior art technique for controlling gelling includes operating the system at a relatively high temperature, such as 180°F. Gelling does not occur as easily at this temperature as it does, for example, at 150°F. The conventional approach, of course, requires a relatively higher heat input.

It is another object of this invention to provide a system which uses a technique for preventing gelling which is not dependent on temperature, and which can therefore be operated using a low heat input.

FROTH QUALITY

A very significant factor influencing froth quality is the uniformity of distribution of the bitumen and solids particles through the body of water. If the particles are relatively far apart, the aerated bitumen can work its way up to the surface without accumulating solids and losing its buoyancy. At the same time, the sand can drop down without taking an appreciable amount of bitumen with it. Spacing of the particles is, of course, maximized by distributing the particles as evenly as possible through the available cell space.

Others in the art have appreciated that good distribution is desirable. Small scale bench units for testing the process have used a centrally positioned impellor to throw the slurry out across the full width of the test cell. However, this is not a feasible arrangement for use in commercial-size cells, which have an inside diameter in the order of fifty feet.

It is therefore an object of this invention to provide a system characterized by improved distribution of the bitumen and solids across the cross-sectional area of the froth formation zone.

Forth quality is improved if part of the low-solids water added to the process is introduced just below the froth formation zone. This water dilutes the system at a point in the process where it is most useful. More particularly, the added water further isolates the bitumen particles at a time when they are being floated to the forth layer. In another aspect, the added water tends to move downwardly through the zone. This movement has the effect of depressing upwardly moving fines and keeping them out of the froth.

It is therefore another object of the invention to provide a system wherein low-solids water is added to the froth formation zone to dilute the concentration of bitumen and solids particles, preferably in a manner which depresses upwardly moving fines.

Experimentation has indicated that the sand settling operation can be carried out at a much higher loading than the froth formation operation. It is therefore another object of the invention to provide a system wherein the two operations are separated so that each can be optimized in both performance and equipment requirements.

SUMMARY OF THE INVENTION

In accordance with the invention, coarse sand separation and bitumen froth formation are carried out in separate vessels or cells. By removing most of the coarse sand from the feed in a sand separation cell, one can subsequently achieve uniform distribution of the bitumen and fines across a froth formation cell. This is possible because improved devices, such as a horizontal perforated pipe, can now be used to deliver the feed to the froth formation zone. Since the coarse sand has been previously removed, there is no danger of plugging the distributing device. Another advantage of using separate cells is that the cross-sectional area for each cell can be specified based on maximum possible loading considerations.

In another aspect of the invention, the froth cell tailings are recycled to the lower end of the sand cell. The froth cell fines are thus delivered to a point adjacent the sand cell tailings outlet. When the system is operating, the concentration of fines builds up to a particular level, (perhaps 18 percent by weight) and remains constant at that level. From this, it can be taken that the excess fines are being removed from the system with the sand cell tailings. The use of a middlings drag stream for this purpose is not necessary.

The recycle stream entering the base of the sand cell creates circulation through the system. The currents created tend to keep the fines moving so that they do not accumulate in the form of a stationary dense bed.

According to another aspect of the invention, an inverted cone may be provided in the sand cell, immediately beneath the slurry introduction unit. This cone functions to outwardly disperse the sand and bitumen particles dropping out of the unit. Cleaner separation of the particles is thereby promoted. The recycle stream is introduced into the sand cell at a point beneath the cone. A conduit is provided leading from the underside of the cone back up to the upper end of the cell. Recycled bitumen particles and semi-buoyant bitumen particles which have accumulated in the conical section of the cell are carried up through the conduit by the recycled water and are transferred to the froth cell for recovery. Thus it is seen that the cone-recycle arrangement helps to improve bitumen recovery.

According to another aspect, solids-free water may be introduced into the froth cell to help separate the bitumen and fines particles and thereby improve the quality of the froth which is formed. Preferably the water is introduced to the cell immediately beneath the froth-water interface. The so-introduced water creates a downward vector through the cell and displaces the fines away from the froth-water interface and toward the tailings outlet. The quality of the froth benefits accordingly.

From the foregoing, it is seen that gelling is attacked from two directions — the fines are kept moving so that they do not form a dense bed, and they are diluted with low-solids water in the froth cell. As a result, the system can be operated at a lower temperature and with less water than has heretofore been conventional. In addition, the middlings drag stream and its attendant secondary recovery cell can be eliminated.

DESCRIPTION OF THE DRAWING

In the drawing:

FIG. 2 is a partly broken away isometric view of the sand and froth cells of FIG. 1.

DESCRIPTION OF THE PREFERRED EMBODIMENT

Figure 1:
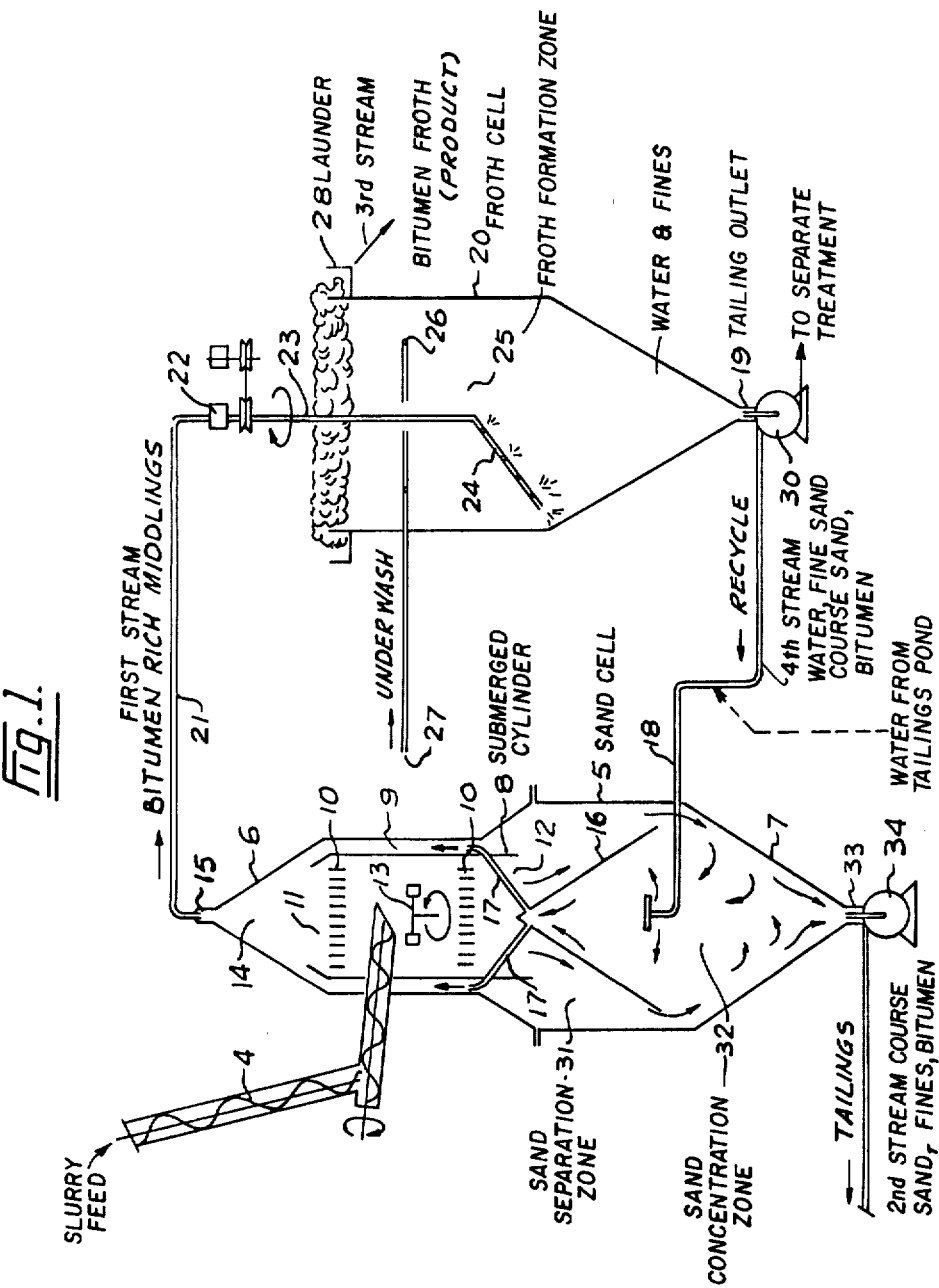
FIG. 1 is a schematic illustration of one embodiment of the invention.

By way of exemplification, the apparatus is now described with reference to the bench scale system shown in FIGS. 1 and 2.

The front end of the system, up to the sand cell, is conventional. It comprises a pug mill 1 having an internal steam sparger means (not shown). The tar sand, water and steam are fed into the pug mill 1 and are mixed therein for sufficient time to heat and disintegrate the tar sand. At the same time, air bubbles are entrained in the slurry which is formed. The product slurry leaves the pug mill 1 and drops through the screen 2 into the slurry hopper 3. On leaving the hopper 3, the slurry is blended with a stream of hot water. The diluted mixture is then delivered by auger 4 into the sand cell 5.

The sand cell 5 is an upright vessel having a cylindrical middle section and conical top and bottom sections 6, 7.

A submerged cylinder 8 is mounted coaxially within the sand cell 5. This cylinder is disposed in spaced relation to the cell's side wall and cooperates therewith to form a vertical annular passage 9. Transverse baffles 10 extend across the top and bottom openings 11, 12 of the cylinder 8, to protect the zones above and below from the turbulence within it. As shown, the auger 4 delivers the slurry into the cylinder. The auger thus provides means, associated with the sand cell intermediate its ends, for introducing the slurry therein. A pump or like means could be used for the same purpose. An impellor 13 rotates within the cylinder and mixes its contents to further disperse the sand and bitumen particles.

The conical top section 6 defines a zone 14 which is in communication with the top opening 11 of the cylinder 8 and the annular passage 9 — the bitumen-rich product of the cell converges into this zone 14 and passes out the cells top outlet 15. This outlet 15 provides means at the upper end of the cell for removing therefrom a first product stream, comprising water, bitumen, fine sand particles and a minor amount of coarse sand particles.

A cone 16 is positioned immediately beneath the cylinder bottom opening 12. This cone has a pair of upwardly extending conduits or tubes 17 which connect the underside of the cone 16 with the annular passage 9. The recycle line 18, from the tailings outlet 19 of the froth cell 20, extends through the wall of the sand cell 5 and terminates beneath the cone 16, for discharging a recycle stream there beneath.

The conical bottom section 7 of the vessel defines a sand concentration zone 32 and includes a bottom outlet 33. The sand tailings leave the vessel through this outlet and are pumped by pump 34 to a tailings pit. The outlet 33 and pump 34 therefore provide means associated with the sand cell vessel at its lower end for removing therefrom a second stream.

The sand cell's top outlet 15 is connected through a line 21 to the froth cell 20.

The froth cell 20 is also an upright vessel, having a cylindrical side wall and conical bottom, and confining a second body of hot water. Its interior cross-sectional area is greater than that of the sand cell 5. The line 21 from the sand cell 5 is connected through a swivel joint 22 to a rotatable vertical feed pipe 23 extending into the froth cell. The feed pipe has a horizontal leg 24 at its lower end; this leg is perforated at intervals along its length. When the feed pipe is rotated, its leg is swept through the interior of the second body of water and evenly distributes the stream from the sand cell 5 across the froth formation zone 25. The feed pipe 23 provides means, associated with the froth cell vessel intermediate its ends, for distributing the first stream thereinto uniformly across its cross sectional area. The line 21 functions to connect the sand cell outlet 15 with the feed pipe for transferring the first stream therebetween.

A circular, perforated underwash tube 26 is positioned in the froth cell 20 above the feed leg 24 and below the expected level of the froth-water interface. A source 27 is connected to the underwash tube for supplying it with low-solids water, which is to be introduced into the froth cell.

A launder 28 runs around the top rim of the froth cell 20 for recovering a third stream, namely the bitumen froth.

The froth cell 20 has a tailings outlet 19 at its bottom end. This outlet provides means for removing from the froth cell a fourth stream, comprising water, fine sand particles, and minor amounts of coarse sand and bitumen. It is connected by a pump 30 and recycle line 18 with the sand cell 5, as stated before.

In operation, the slurry is introduced into the body of hot water in the sand cell 5 through the auger 4. As the slurry swirls around within the cylinder 8, the sand and bitumen particles are further dispersed. Bitumen particles, together with some solids, float up through the cylinder and out its upper opening 11 into the zone 14. Most of the coarse sand, together with some fines and bitumen, settle out through the cylinder's bottom opening 12 into the sand separation zone 31. Here they are distributed outwardly by the cone 16. As they move through the sand separation zone 31, bitumen particles and some fines begin to rise and float up through the annular passage 18 into the zone 14. The coarse sand particles, together with some bitumen and fines, drop into the conical sand concentration zone 32. Here they move downwardly, toward the tailings outlet 33, and are simultaneously packed together. Some bitumen particles trapped in the sand are squeezed out; these particles rise back through the cell 5 or collect above the tailings outlet. The coarse sand particles are removed through the tailings outlet as a second product.

A stream of water, fines and minor amounts of bitumen and coarse sand, is recycled from the froth cell tailings outlet 19 into the lower end of the sand cell 5. This stream establishes an upward flow through the tubes 17, annular passage 18 and zone 14. The constant circulation functions to keep the fines in the sand cell from gelling and rendering the cell inoperative. It also functions to carry non-buoyant bitumen from the lower end of the sand cell up to the zone 14.

While it is preferred to recycle the froth cell tailings to the sand cell, one may alternatively supply water to the recycle line from another source, such as the tailings pond, and treat the froth cell tailings in a secondary oil recovery unit, if desired. In fact, one may even operate the system without introducing water at the lower end of the sand cell, although many advantages of the invention will be lost in doing so.

The first product from the zone 14 is transferred to the line 21 into the froth cell 20. It enters the body of hot water contained therein through the perforations in leg 24 and is distributed evenly across the cross sectional area of the body. At the same time, hot water is fed into the froth cell 20 through the underwash tube 26. The bitumen floats upwardly and forms a froth which is recovered in the launder 28. The water and fines move downwardly to the tailings outlet 19 and exits as a fourth product.

The method is illustrated by the following example:

A system in accordance with FIG. 2 was operated continuously for four hours as follows: 240 lb/hr. of tar sand, comprising 11.33 percent by weight bitumen, 4.33 percent water, and 84.04 percent solids, including 17.9 percent fines, were fed to a pugmill. The tar sand had a pH of 7.8. Sufficient fresh hot water, pre-heated to 180°F, was added to the tar sand to produce a slurry containing 24 percent by weight water. The pugmill was externally heated with a steam jacket. The product slurry was observed to have a temperature of 154° – 155°F. The residence time in the pugmill was approximately 2½ minutes.

The slurry was fed by a screw auger from the pugmill into a sand cell. Water, at 180°F, was added to the slurry at the screw auger to raise the water content to approximately 28 percent. The sand and froth cells were both filled with clear water at 180°F at the time the test run was initiated. The underflow from the froth cell was recycled to the underside of the cone at a rate of 6.6 pounds/minute. Clear water, at a temperature of 180°F, was fed into the froth cell through the underwash ring at a rate of 7 – 10 lb./100 lb. of tar sand being introduced to the system.

The following table lists the compositions, in weight percent, of the sand cell tailings, recycle, and product froth streams:

| Stream | % oil | % water | % solids |
|---|---|---|---|
| Sand cell tailings | 0.56 | 35.48 | 63.96 |
| Recycle | 1.70 | 80.28 | 18.03 |
| Product froth | 81.4 | 13.7 | 4.9 |

The oil or bitumen recovery from the system was 93.5 percent. The total water used was 40.3 pounds per 100 pounds of tar sand processed.

What is claimed is:

1. A two-cell separator, for use in the hot water process for extracting bitumen from a slurry containing bitumen, coarse and fine sand particles, and water, comprising:
   a. a sand cell vessel having a side wall and conical bottom and adapted to contain a body of hot water,
   b. means associated with the sand cell vessel intermediate its upper and lower ends for introducing the slurry thereinto,
   c. means associated with the sand cell vessel at its upper end for removing therefrom a first stream,
   d. means extending into the sand cell vessel's lower end for discharging a recycle stream thereinto,
   e. means associated with the sand cell vessel at its lower end for removing therefrom a second stream;
   f. a froth cell vessel having a side wall and adapted to contain a body of hot water,
   g. means, associated with the froth cell vessel intermediate its upper and lower ends, for distributing the first stream thereinto uniformly across its cross-sectional area,
   h. means associated with the froth cell vessel at its upper end for removing therefrom a third stream,
   i. means associated with the froth cell vessel at its lower end for removing a fourth stream,
   j. means connecting the means (c) with the means (g) for transferring the first stream therebetween; and
   k. means connecting the means (i) with the means (d) for recycling the fourth stream therebetween.

2. The separator as set forth in claim 1 comprising cylinder means combining with the inner surface of the sand cell vessel's side wall to define an upwardly extending annular passage;
   a cone, having a downwardly and outwardly diverging wall extending toward the sand cell vessel's side wall, disposed beneath the cylinder for distributing the bitumen and sand particles across the interior of the vessel;
   at least one upwardly extending conduit connecting the underside of the cone with the annular passage; and
   the means (d) terminates beneath the cone whereby the recycle stream is delivered there beneath.

3. The separator as set forth in claim 2 comprising:
   means, disposed in the froth cell vessel above the means (g), for introducing low-solids water thereinto.

4. The separator as set forth in claim 1 wherein:
   the interior cross-sectional area of the froth cell vessel is substantially greater than that of the sand cell vessel.

* * * * *